United States Patent
Shin et al.

(10) Patent No.: US 9,774,772 B2
(45) Date of Patent: Sep. 26, 2017

(54) CAMERA MODULE WITH ADJUSTABLE LENS TILT

(71) Applicant: Samsung Electronics Co., Ltd., Gyeonggi-do (KR)

(72) Inventors: Doosik Shin, Gyeonggi-do (KR); Hyungjin Rho, Seoul (KR); Youngkwon Yoon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/313,244

(22) Filed: Jun. 24, 2014

(65) Prior Publication Data

US 2015/0009400 A1 Jan. 8, 2015

(30) Foreign Application Priority Data

Jul. 4, 2013 (KR) ........................ 10-2013-0078424

(51) Int. Cl.
*H04N 5/225* (2006.01)
*G03B 5/00* (2006.01)

(52) U.S. Cl.
CPC ............ *H04N 5/2254* (2013.01); *G03B 5/00* (2013.01); *H04N 5/2252* (2013.01); *H04N 5/2257* (2013.01); *G03B 2205/0023* (2013.01); *G03B 2205/0069* (2013.01); *G03B 2217/002* (2013.01)

(58) Field of Classification Search
CPC .. H04N 5/2251; H04N 5/2252; H04N 5/2254; H04N 5/2257; G03B 5/00; G03B 2205/0023; G03B 2205/0069
See application file for complete search history.

(56) References Cited

U.S. PATENT DOCUMENTS

| | | | |
|---|---|---|---|
| 6,088,533 A * | 7/2000 | Shiomi ................ | G02B 27/646 396/52 |
| 7,426,081 B2 * | 9/2008 | Paik ..................... | G02B 7/102 359/694 |
| 7,511,904 B2 * | 3/2009 | Hu ........................ | G02B 7/08 359/694 |
| 7,995,297 B2 * | 8/2011 | Chou ................... | H02N 2/026 310/311 |
| 8,040,623 B2 * | 10/2011 | Shyu ..................... | G02B 7/08 310/323.02 |
| 8,279,541 B2 * | 10/2012 | Henderson ........... | G02B 7/022 359/811 |
| 2006/0013577 A1 * | 1/2006 | Uemura ................ | G03B 17/00 396/79 |
| 2007/0217775 A1 * | 9/2007 | Shirono ............... | G02B 7/102 396/72 |

(Continued)

FOREIGN PATENT DOCUMENTS

KR 10-0849580 B1 7/2008
KR 10-2010-0048246 A 5/2010

*Primary Examiner* — Daniel M Pasiewicz
(74) *Attorney, Agent, or Firm* — Cha & Reiter, LLC (57) ABSTRACT

A camera module is provided including: a housing; a lens assembly provided in the housing to move up and down in a direction of an optical axis of an image sensor, and including at least one lens; and a driving unit that produces driving force for moving the lens assembly, arranged at a position adjacent to the lens assembly, and fixed to the housing by at least one detachable insertion member.

10 Claims, 9 Drawing Sheets

(56) References Cited

U.S. PATENT DOCUMENTS

| | | | | |
|---|---|---|---|---|
| 2008/0144201 A1* | 6/2008 | Koc | ........................ | G02B 7/021 |
| | | | | 359/824 |
| 2008/0192363 A1* | 8/2008 | Shirono | ................... | G02B 7/08 |
| | | | | 359/698 |
| 2008/0198462 A1* | 8/2008 | Sekino | ................. | G02B 27/646 |
| | | | | 359/557 |
| 2009/0052037 A1* | 2/2009 | Wernersson | ......... | G02B 27/646 |
| | | | | 359/554 |
| 2009/0067068 A1* | 3/2009 | Yu | ........................ | H04N 5/2257 |
| | | | | 359/823 |
| 2009/0316040 A1* | 12/2009 | Takatsuka | ................ | G02B 7/08 |
| | | | | 348/376 |
| 2010/0182490 A1* | 7/2010 | Seol | ........................ | G02B 7/08 |
| | | | | 348/345 |
| 2011/0134549 A1* | 6/2011 | Hase | ...................... | G02B 7/102 |
| | | | | 359/824 |
| 2011/0141294 A1* | 6/2011 | Lam | ........................ | G03B 5/00 |
| | | | | 348/208.1 |
| 2012/0039589 A1* | 2/2012 | Ku | .......................... | G03B 5/00 |
| | | | | 396/55 |
| 2012/0140326 A1* | 6/2012 | Takeda | ................. | G02B 13/001 |
| | | | | 359/554 |

* cited by examiner

CAMERA MODULE WITH ADJUSTABLE LENS TILT

CLAIM OR PRIORITY

This application claims priority from and the benefit under 35 U.S.C. §119(a) of Korean Patent Application No. 10-2013-0078424, filed on Jul. 4, 2013, which is hereby incorporated by reference for all purposes as if fully set forth herein.

TECHNICAL FIELD

The present disclosure relates to camera modules, and more particularly to a camera module with adjustable lens tilt.

BACKGROUND

Figure 1:
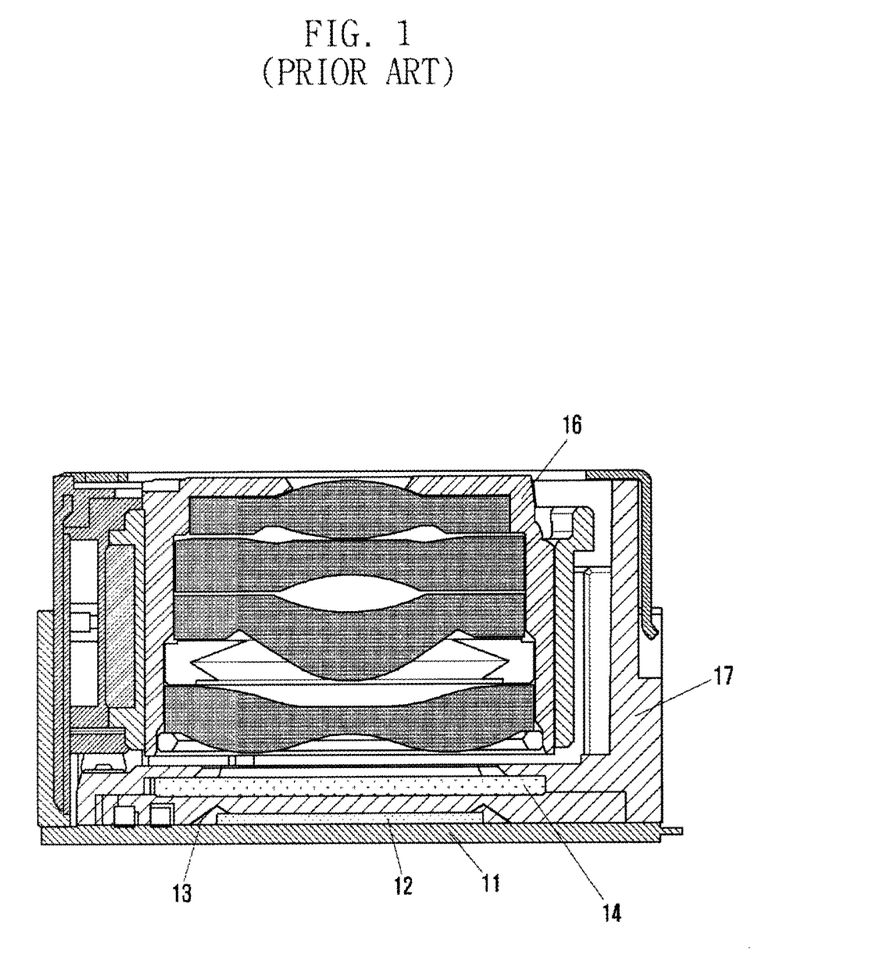
FIG. 1 depicts an example of a camera module that is known in the prior art.

Compact camera modules are small in size and can be integrated into various electronic devices, such as camera phones, PDAs, smart phones, toy cameras, and the like. FIG. 1 depicts an example of a camera module 10 as it is known in the prior art. In this example, an image sensor 12 is at first die-bonded on the upper surface of a printed circuit board 11, and then wire-bonded to connect the image sensor 12 and the printed circuit board 11 electrically by using a wire 13. A cover glass or an infrared (IR) filter 14 is fixed to a bracket by using an adhesive such as epoxy, and fixed on the printed circuit board 11 by using an adhesive such as epoxy. A lens assembly 16 is seated through an opening of an upper end of the bracket mounted on a printed circuit board 11. Thus, in this example, the camera module 10 is assembled by using a wire bonding, the electrical connection is achieved by using a wire 13 so that the image sensor 12 is bonded on the printed circuit board 11.

However, problems may be produced such as a tilt and the like due to dimension tolerances between elements, or lack of accuracy of the devices, and the like, during the assembly process of the above described camera module, which lead to errors of resolution of the camera module. Especially, with regard to the optical axis alignment of the lens and the sensor, since a high resolution camera module requires high precision with regard to the optical axis alignment, in contrast to a case of low resolution, a precision degree of the device becomes higher as a resolution becomes higher, so that the cost for the development and mass production becomes higher.

Accordingly, the need exists for new techniques for assembling camera modules.

SUMMARY

The present disclosure addresses this need. According to one aspect of the disclosure, a camera module is provided comprising: a housing; a lens assembly provided in the housing to move up and down in a direction of an optical axis of an image sensor, and including at least one lens; and a driving unit that produces driving force for moving the lens assembly, arranged at a position adjacent to the lens assembly, and fixed to the housing by at least one detachable insertion member.

According to another aspect of the disclosure, a method is provided for correcting a tilt of a camera module having an image sensor and a driving unit coupled to a housing by at least one insertion member to produce driving force to move a lens assembly up and down in the direction of an optical axis of the image sensor, the method comprising: detecting whether errors are produced due to a tilting of the lens based on output of the image sensor; and deciding, by a processor, whether to perform a passive assembly process or an active assembly process according to a result of the determining step. In addition, determining whether errors are produced due to the tilting of the lens may include detecting resolutions of a central section and a surrounding section of an image produced by the image sensor; and detecting that errors are produced due to the tilting of the lens when the detected resolutions of the central section and the surrounding section fail to meet preset specifications, and determining that errors are not produced when the detected resolutions of the central section and the surrounding section meet the preset specifications.

As described above, according to a camera module supporting a tilt correction according to the present disclosure, it is possible to realize a structure of a camera module so that a type conversion from a passive type assembly process to an active type assembly process can be achieved when a camera module of an auto focusing type actuator is manufactured. Therefore, it is possible to reduce time for the assembly process of a camera module, and is possible to apply the mass production process because the cost for the facility investment can be reduced.

Also, according to a method for correcting a tilt of a camera module according to the present disclosure, it is possible to compensate for errors due to the tilt of the lens effectively by successively converting into the active assembly process type by using the active alignment device, although the lens assembly and the driving unit are assembled according to a passive assembly process firstly, when a camera module is manufactured.

BRIEF DESCRIPTION OF THE DRAWINGS

The above and other aspects, features and advantages of the present disclosure will be more apparent from the following detailed descriptions in conjunction with the accompanying drawings, in which.

DETAILED DESCRIPTION

Hereinafter, aspects of the present disclosure will be described in detail with reference to the accompanying drawings. Technical contents which are not directly related to the present disclosure and/or are well-known in the art may be omitted. It is to be understood that some constituting elements may be exaggerated, not drawn up to scale, omitted, or schematically shown in the appended drawings. Accordingly, the present disclosure is not restricted by a relative size or clearance shown in the appended drawings.

According to aspects of the disclosure, a structure and method are provided for assembling a camera module to prevent a decrease in resolution resulting from a tilt of the camera module's lenses that is introduced when the camera module is first assembled. More specifically, the present disclosure provides a camera module design that can be assembled by using either one of a passive assembly process and an active assembly process, when the camera module is manufactured.

In a detailed embodiment of the present disclosure, the characterized structure which is developed to enable the application of the type conversion from a passive assembly process into an active assembly process is a structure that utilizes a detachable insertion member.

For example, the passive assembly process may include a process in which a driving unit for driving the lens assembly is fixed within a camera module housing by using an insertion member after which the housing including the lens assembly is hardened. As another example, the active assembly process may include a process that hardens the housing including the lens assembly after compensating for a tilt produced when the camera module is first assembled by using the passive assembly process. The tilt may be compensated for by tilting the lens assembly relative to the housing through a space between the housing and the lens assembly by using an active alignment device.

The tilting compensation may include an operation performed to align the optical axis of the image sensor and the optical axis of the lens assembly. As is discussed further below, it is possible to align the optical axes by adjusting the positions and/or inclination degrees of the optical elements of the camera module.

According to aspects of the disclosure, a driving unit of a camera module is first fixed within the housing of the camera module by using one or more insertion members. Next, images captured by the camera module are analyzed to determine whether the images contain errors due to a tilt of the lens inside the camera module.

If no errors are found, the assembly of the insertion member for fixing the driving unit to the housing is maintained and further procedures, such as hardening the housing, may be performed.

On the other hand, if errors are found, the active assembly process is performed after a removal of the insertion member. That is, the driving unit is tilted by applying the active alignment device through the hole in which the insertion member was inserted prior to being removed. As the lens assembly is tilted according to the tilting of the driving unit, it is possible to compensate for the tilt of the lens. After compensating for the tilt of the lens through the tilting of the driving unit, further procedures such as hardening the housing may be performed.

Figure 2:
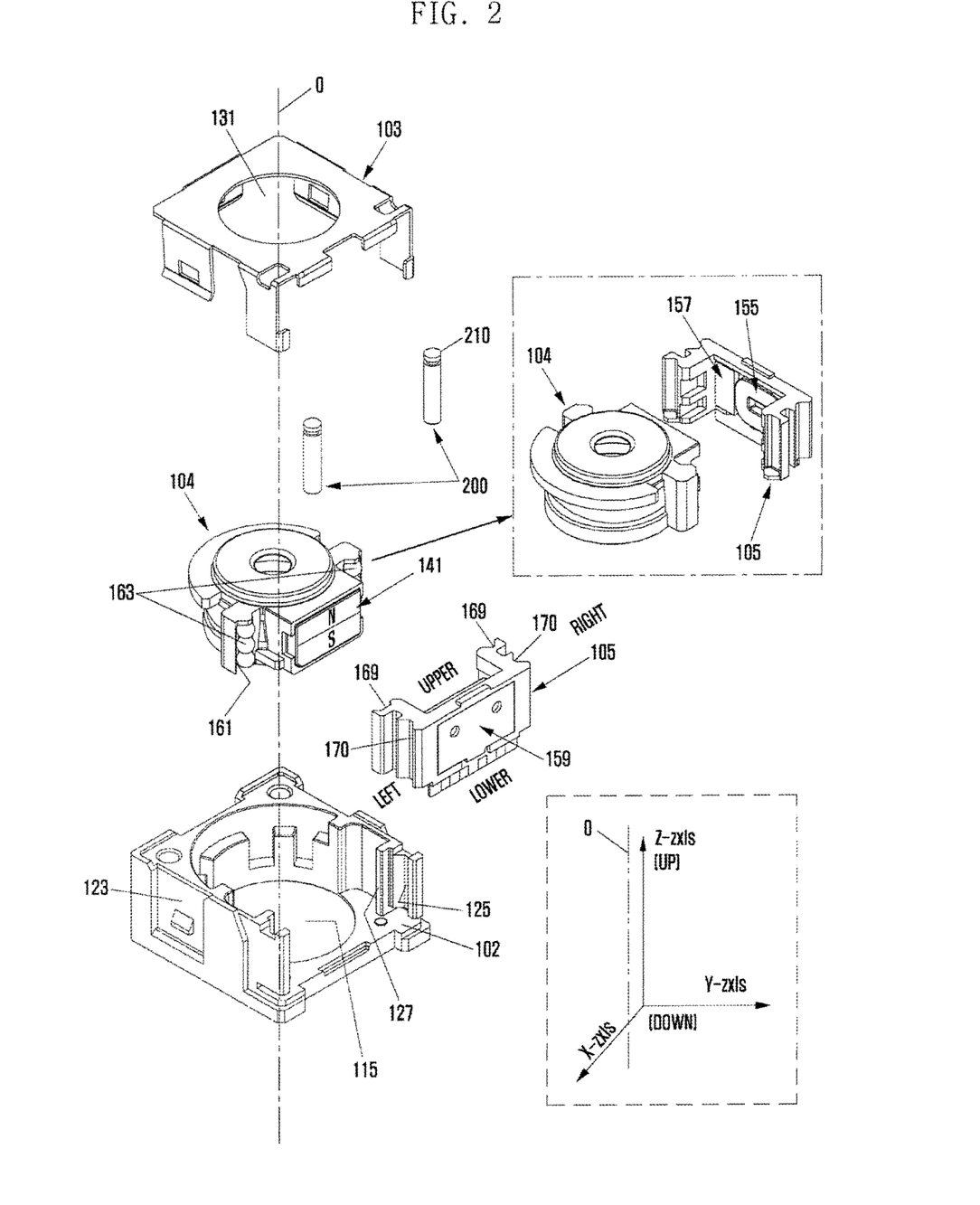
FIG. 2, FIG. 3 and FIG. 4 are exploded perspective views of an example of a camera module according to aspects of the present disclosure.
Figure 3:
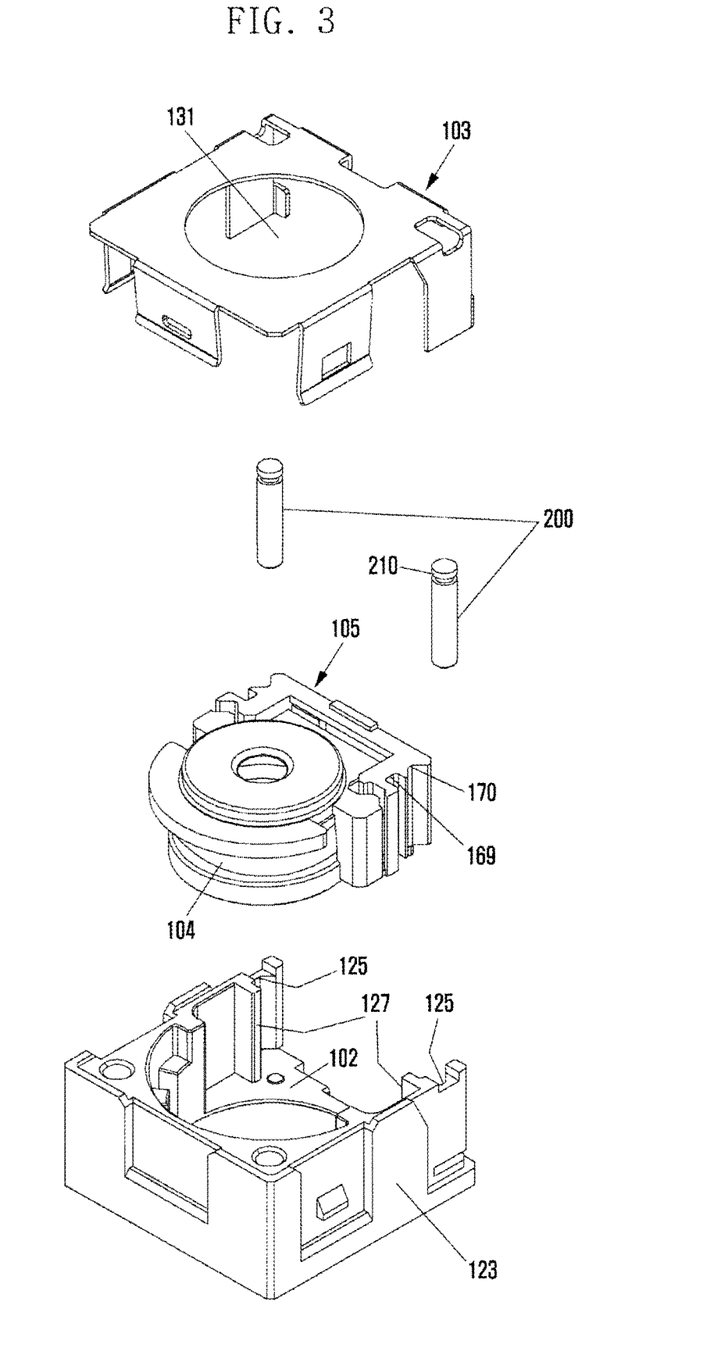
Figure 4:
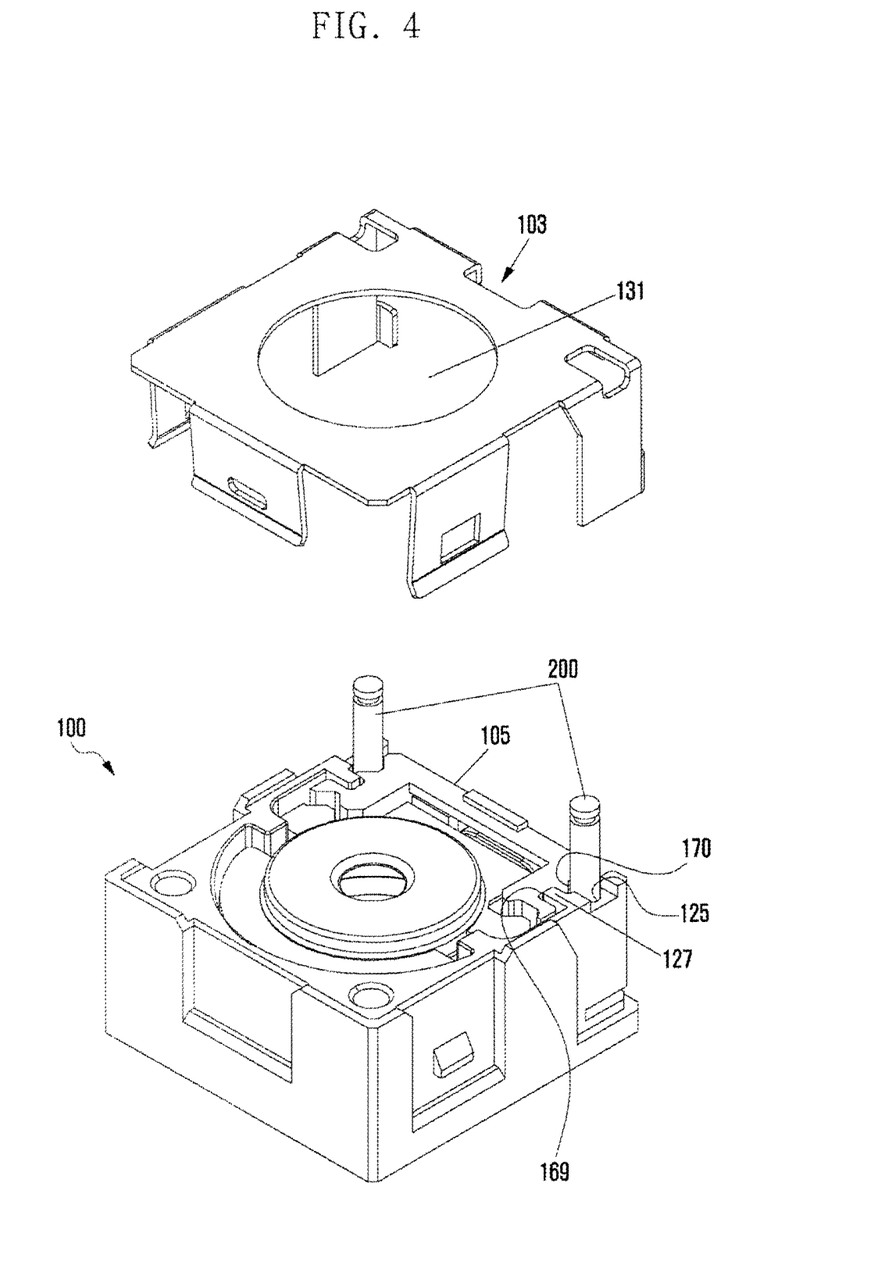
Figure 5:
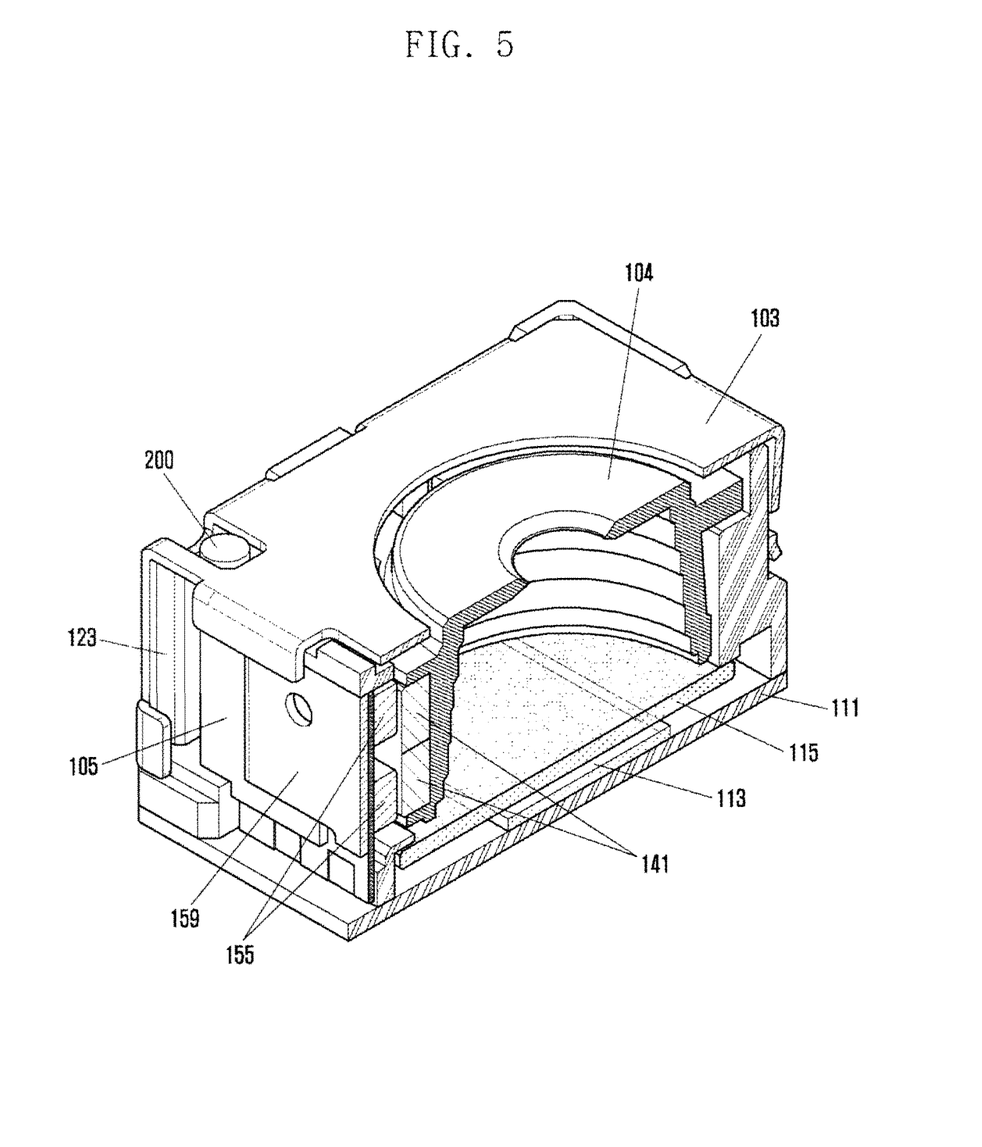
FIG. 5 and FIG. 6 are views showing examples of partial sections of a camera module according to aspects of the present disclosure.
Figure 6:
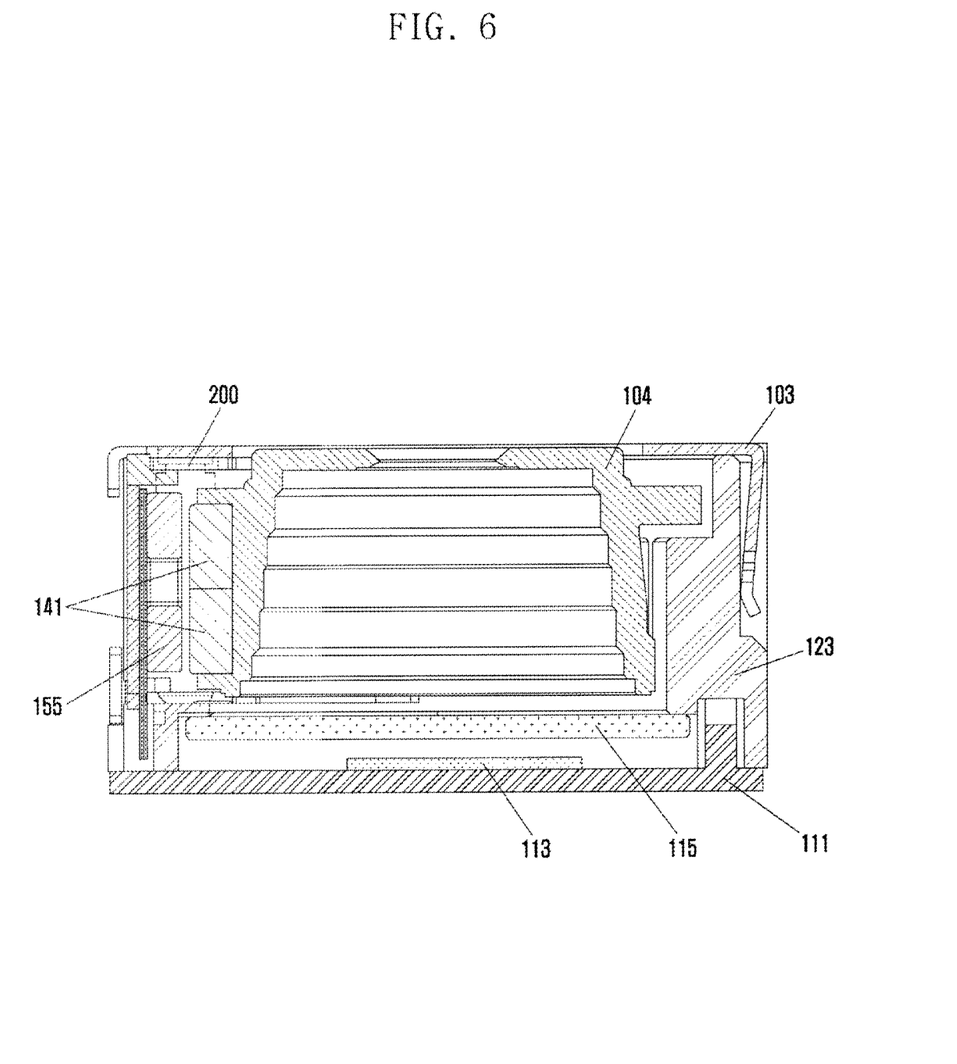

FIGS. 2 to 4 are exploded perspective views of an example of a camera module according to aspects of the present disclosure. FIGS. 5 and 6 are views showing examples of partial sections of a camera module according to aspects of the present disclosure. As illustrated, the camera module 100 may include a circuit substrate 111, an image sensor 113, an infrared filter 115, a filter housing 102, a guide housing 123, a lens assembly 104, a driving unit 105, a magnetic body 141, a coil 155, a yoke 159, a hole sensor 157, a ball 163, and at least one of insertion members 200. The lens assembly 104 includes an image sensor 113, a circuit substrate 111, and a flexible printed circuit (not shown). The image sensor 113 is mounted on one side of the circuit substrate 111 by means of wire bonding, and the flexible printed circuit extends from the circuit substrate 111 and is connected to a main circuit substrate of a mobile communication terminal or a camera. The image sensor 113 is aligned with the optical axis O of the lens assembly 104. The image sensor 113 faces the lens assembly 104 and detects an image of an object that is visible through the lens assembly. The image sensor 113 transmits signals representing the image to a central processing unit (or another type of electronic circuitry) through the circuit substrate 111.

A filter housing 102 is provided on the circuit substrate 111 for installing the infrared filter 115. The filter housing 102 may enclose the image sensor 113. The filter housing 102 includes an opening for letting light through to the image sensor 113, such that the infrared filter 115 is disposed between the opening and the image sensor 113. In this arrangement, all light reaching the image sensor 113 must first pass through the filter 115.

A guide housing 123 extends along the optical axis O at one side of the filter housing 102. The guide housing 123 surrounds at least a portion of the outer surface of the lens assembly 104 so that it may guide the lens assembly 104 to move up and down along the optical axis O. A top cover 103 is mounted on the guide housing 123 to protect the driving unit 105 and the lens assembly 104. As illustrated, in this example, the guide housing 123 is a structure having one open side, and the driving unit 105 is received in that open side.

The driving unit 105 is provided at one side of the lens assembly 104 to move the lens assembly 104 up and down along the optical axis O. A guide unit may be additionally provided between the lens assembly 104 and the driving unit 105.

The lens assembly 104 is provided with at least one lens at the inside thereof, and moves up and down the optical axis O to adjust a focus distance along the optical axis O. The lens assembly 104 might be provided in the guide housing 123 so that the optical axis of the lens assembly 104 can be aligned with the optical axis of the image sensor 113.

The magnetic body 141 is mounted on one side of the lens assembly 104. The magnetic body 141 faces the driving unit 105, and reacts with the coil 155 provided in the driving unit 105 to produce a driving force for moving the lens assembly 104 up and down. In some implementations, a yoke 159 may be further provided at one side of the lens assembly 104 to induce a magnetic field of the magnetic body 141 in the direction of the driving unit 105. The yoke 159 may be provided between the magnetic body 141 and the lens assembly 104.

In addition, the coil 155 is provided at one side of the driving unit 105 to face the magnetic body 141. When electric current is applied to the coil 155, the coil 155 produces an electric field, so that the electric field of the coil 155 reacts with the magnetic field of the magnetic body 141 to produce a driving force for moving the lens assembly 104 along the optical axis. The driving unit 105 may be further provided with a yoke 159 to induce an electric field of the coil 155 in the direction of the magnetic body 141. The yoke 159 may be mounted on one side of the driving unit 105, and the coil 155 may be coupled to the yoke 159.

In order to detect a position change of the lens assembly 104, the driving unit 105 is provided with a hole sensor 157 to detect a position change of the magnetic body 141 of the lens assembly 104. Since the magnetic body 141 is mounted on the lens assembly 104, the hole sensor 157 can detect the position change of the lens assembly 104.

The hole sensor 157 is attached to the yoke 159 together with the coil 155, wherein the hole sensor 157 is disposed close to the coil 155 or surrounded by the coil 155. Furthermore, the driving unit 105 may be provided with a flexible printed circuit board (not shown) to supply power to the coil 155 and the hole sensor 157, and transmit information sensed by the hole sensor 157 to a central processor or another type of processing circuitry.

When electric current is applied to the coil 155, an electric field is produced by the coil 155 which interacts with the magnetic field of the magnetic body 141 and causes the lens assembly 104 to move along the optical axis O. In some aspects, the moving distance of the lens assembly 104 depends on the amount of current applied to the coil 155. Thus, by varying the amount of current supplied to the coil 155, the focus distance of the camera module 100 may be adjusted.

The guide unit includes a pair of guide grooves 169 formed at one side of the lens assembly 104, receiving grooves 161 formed at the driving unit 105 to face the guide grooves 169, and balls 163 respectively received in the receiving grooves 161.

The guide grooves 169 may have a V-shaped cross-section, extend in the direction of the optical axis O, and may be disposed at both sides of the magnetic body 141. Each of the receiving grooves 161 is disposed to face a different one of the guide grooves 169. In some implementations, the receiving groves 161 may also have a V-shaped cross-section. The guide grooves 169 and the receiving grooves 161 restrict the lens assembly 104 to move only along the optical axis O.

The balls 163 are received in respective receiving grooves 161, and a portion of the outer surface protrudes into the receiving grooves 161 to contact an inside wall of the grooves 169. Also, the balls 163 are rotated respectively in the receiving grooves 161 and the guide grooves 169 to facilitate upward and downward movement of the lens assembly 104. That is, some portion of the balls 163 is received in the receiving grooves 161, and the other portion is received in the guide grooves 169, to thereby form a predetermined clearance between the driving unit 105 and the lens assembly 104. The balls 163 may help reduce friction between the lens assembly 104 and driving unit 104. The balls 163 may move in a direction in which the guide grooves 169 extend because the guide grooves 169 and the receiving grooves 161 have V-shaped cross-section.

The driving unit 105 is provided at one open side of the guide housing 123. At this time, a desired interval may be formed between the driving unit 105 and the guide housing 123. That is, the driving unit 105 is disposed to contact the housing 102, 123 at least at one side thereof, and it is constructed that an interval is provided at least at one side among an upper, lower, right, and left side in addition to the contact side so that it is possible to achieve active alignment afterwards. In some aspects, the driving unit 105 includes a groove 169 at the outer surface thereof, which engages with the protrusion sections 127 of the guide housing 123. That is, the protrusion section 127 is inserted into and engaged with the groove 169 formed on the outer surface of the driving unit 105. In some aspects, the size of the protrusion sections 127 may be smaller than the sizes of the respective grooves 169. The difference in sizes may permit a play of the driving unit 105 when the protrusion sections 127 are inserted into the groves 169. Thus, because the sizes of the protrusion sections 127 and the groves 169 are different, the driving unit 105 may be able to move laterally (e.g., in a direction transverse to the optical axis O or the Z-axis, which is parallel to the optical axis O), when the protrusion sections 127 are inserted into the groves 169 Especially, the camera lens assembly 100 of the present disclosure fixes the driving unit 105 to the filter housing 102 and the guide housing 123 by using the insertion members 200 which can be inserted into holes. The holes in this example consist of a portion 170 of an outer surface of the driving unit 105 and a portion 125 of the inner surface of the guide housing 123. At this time, the insertion members 200 can closely contact a portion 170 of the outer surface of the driving unit 105 and a portion 125 of the inner surface of the guide housing 123. The insertion members 200 may extend in the same (or substantially the same) direction as the optical axis O. The insertion members 200 may be formed so that the upper portion 210 thereof, which is higher than the upper surface of the driving unit 105, is larger in size than the size of the holes. Each of the insertion members 200 can include shaft, a ball, a plate, a spring, a wire, a block, and a clip, and/or any other suitable type of device. Furthermore, in some implementations, the insertion members 200 can be made of an elastic material.

Figure 7:
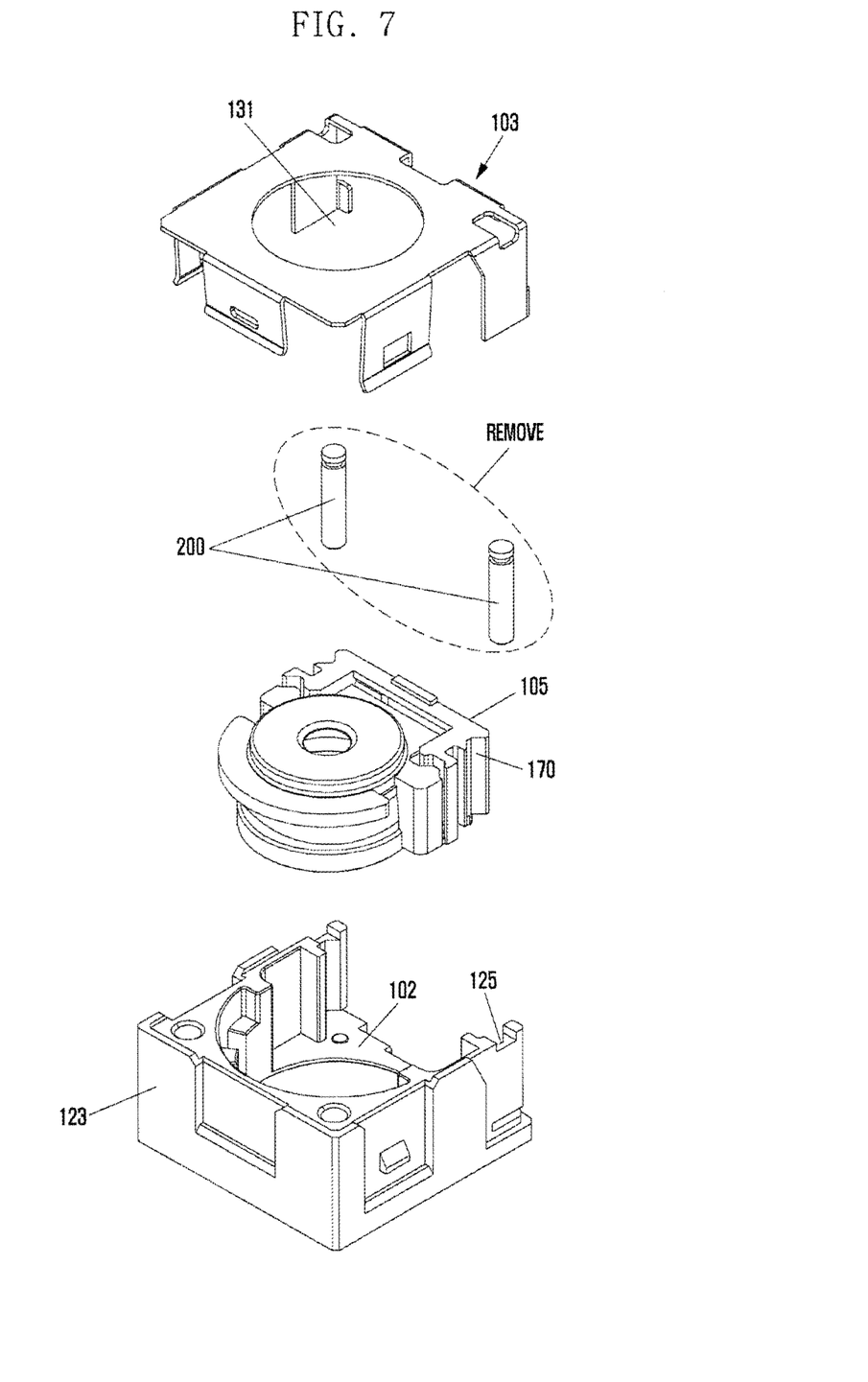
FIG. 7 and FIG. 8 are exploded perspective views of an example of a camera module according to aspects of the present disclosure.
Figure 8:
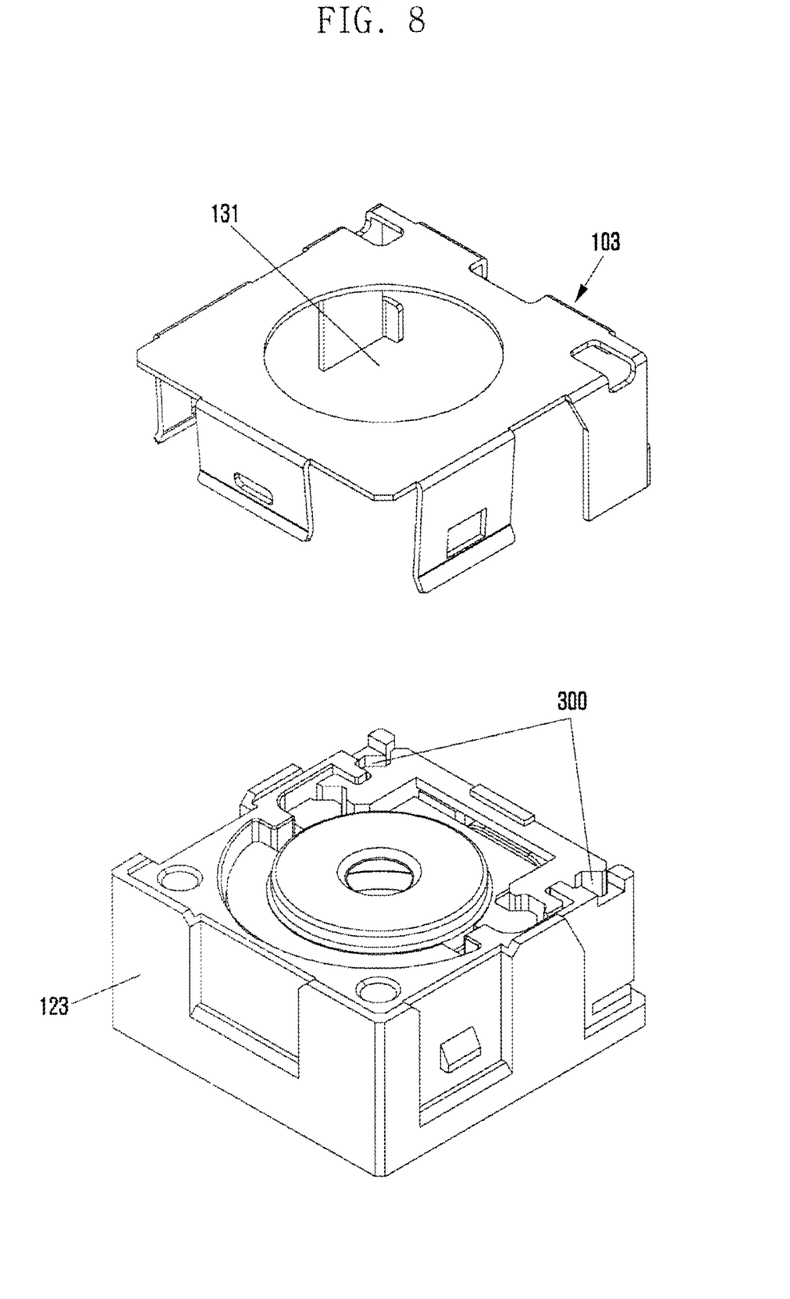

Referring to FIGS. 7 and 8, the insertion members 200 are removed and the holes are left empty Once the insertion members 200 are removed, the tilting of the driving unit 105 can be adjusted through the holes. Specifically, the tilting of the driving unit 105 can be adjusted by reaching and moving the driving unit 105 with an active alignment device. Because the driving unit 105 is magnetically coupled with the lens assembly 104, adjusting the tilting of the driving unit 105 also results in an adjustment of the tilting of the lens assembly 104.

The top cover 103 engages with the guide housing 123 to thereby maintain the lens assembly 104 fixed in place, and is formed with an opening section 131 to provide a passage of light to the image sensor 113. Hereinafter, referring to FIG. 9, a method for correcting a tilt of a camera module according to an embodiment of the present disclosure will be described in detail below.

Figure 9:
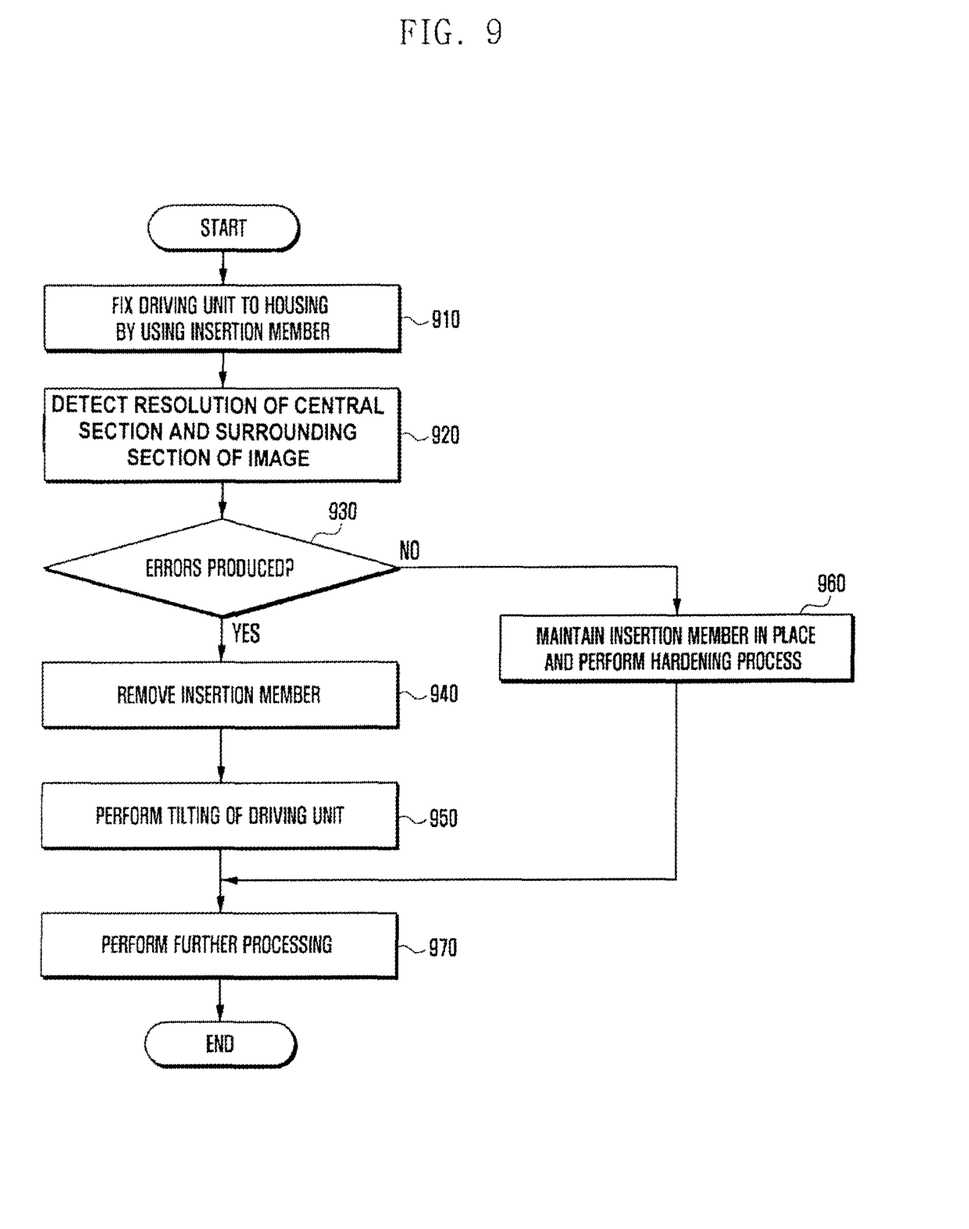
FIG. 9 is a flowchart of an example of a process for correcting a tilt of a camera module according to aspects of the present disclosure.

FIG. 9 is a flowchart of an example of a process for correcting a tilt of a camera module according to aspects of the present disclosure. According to the process, at first, the driving unit 105 is fixed and assembled to the housing by using the insertion members 200 in operation 910. That is, a portion of the passive assembly process is at first performed.

As discussed above, in the passive assembly process, an operation of providing the lens assembly 104 with the magnetic body 141 on the inside surface of the guide housing 123 and the upper side of the filter housing 102 is performed, then an operation of arranging the driving unit 105 for driving the lens assembly 104 at a position facing the magnetic body 141 is performed, and then an operation of assembling the ball 163 so that it is received in the guide groove 169, is performed. Here, the driving unit 105 is provided with a desired clearance at one open side of the guide housing 123 and a part of both sides of the guide housing 123 adjoining the open side. One side of the driving unit 105 is in contact with at least at one side of the guide housing 123 and the filter housing 102, so that the driving unit should be constructed to have a clearance at least at one side of the upper, lower, left, and right side except for the contact side to enable the active alignment afterwards.

Especially, the insertion members 200 are fitted in the holes formed by a portion 170 of the outer surface of the driving unit 105 and a portion 125 of the inner surface of the guide housing 123. At this time, the insertion members 200 can be closely contacted with the portion 170 of the outer surface of the driving unit 105 and the portion 125 of the inner surface of the guide housing 123. The insertion members 200 can be formed to extend along the direction of the optical axis O. The insertion members 200 may be formed so that their upper portions, which are disposed higher than the upper surface of the driving unit 105, have a larger in size than the holes. In some aspects, having larger upper portion 210 sizes may permit the insertion members 200 to restrict the driving unit 105 to move up and down within the guide housing 123 in the direction of the optical axis O. The insertion members 200 can be implemented as a shaft, a ball, a plate, a spring, a wire, a block, a clip, and/or any other suitable type of device.

Then, in operation 920, an image captured by the image sensor 113 is acquired through camera module and resolutions of the central section and the section of the peripheral section are detected based on the output image. The detection may be performed by a processor and/or any suitable type of processing circuitry that is coupled to the image sensor.

Next, it is determined whether errors due to the tilt of the lens occur through the analysis of the central section and the peripheral section of the output of the image sensor in operation 930. The determination may be performed by a processor and/or any suitable type of processing circuitry that is coupled to the image sensor.

For example, if the resolutions of the central section and the peripheral section output through the image sensor are not conformed to the specifications set previously, it can be determined that errors are produced due to the lens tilt. Contrary to this example, if the resolutions of the central section and the peripheral section output through the image sensor are conformed to the specifications set previously, it can be determined that errors are not produced due to the tilting of the lens. Ideally, the camera module has been set to achieve an object that resolutions of the central section and the peripheral section output through the image sensor are the same.

If it is determined that errors are produced due to the tilting of the lens in operation 930, the type of a process is converted to the active assembly process. That is, it is possible to convert the passive assembly process which is performed in operation 910 to the active assembly process. The converted active assembly process will be described in operations 940 and 950.

Then, the insertion members 200 are first removed from the holes in operation 940 in order to vacate the holes. In some aspects, the removal may be performed manually and/or by automated assembly equipment under the control of a controller (e.g., a processor). It is also possible to secure a spacing that can perform the tilting of the driving unit 105, by moving the insertion members 200 or modifying the structure. In operation 950, the tilting of the driving unit 105 is adjusted, through at least one of the holes. In some aspects, the adjustment may be performed manually and/or by automated assembly equipment under the control of a controller (e.g., a processor). More particularly, in some implementations, the adjustment can be performed by an active alignment device. Concurrently, the tilting of the filter housing 102 and the guide housing 123 can be performed by using the active alignment device. At this time, the tilting of the driving unit 105 relative to can be performed around a y-axis, and the tilting of the housings 102, 123 can be performed in a direction that is perpendicular to the tilting of the driving unit 105. As discussed below, it is possible to compensate for the errors produced from the tilting of the lens by controlling the tilting of the driving unit 105, because the lens assembly 104 is magnetically coupled to the driving unit 105 and tilting the driving unit results in the lens assembly being tilted, as well. Specifically, the driving unit 105 can move (or rotate) in the direction of the optical axis and two directions perpendicular to each other on the plane which is perpendicular with respect to the optical axis O by means of the active alignment device. The directions set to extend perpendicular to each other in the plane perpendicular to the direction of the optical axis O are referred to as a first direction (X-axis) and a second direction (Y-axis) respectively, and the direction of the optical axis of the lens assembly can be referred as a third direction (Z-axis).

The optical axis of the driving unit and the optical axis of the image sensor can be conformed to each other by arranging the optical axis of the image sensor 113 to be coincident with the optical axis of the lens assembly 104, after crossing the optical axis of the lens assembly 104 and the optical axis of the image sensor 113 in the image formation plane of the image sensor 113 by using the active alignment device in operation 940.

Further processing is then performed in operation 970 after compensating for errors due to the tilting of the lens. The further processing may include of hardening the housing 123, 102 including the lens assembly 104, and the like. That is, it is possible to secure the driving unit 105 to the housing 123, when the optical axis of the image sensor and the optical axis of the lens assembly are conformed to each other.

Meanwhile, if it is determined that errors are not produced due to the tilting of the lens in operation 930, it is possible to maintain the performed passive assembly process as it is in operation 910. Then the passive assembly process is explained by the operation 960.

The assembly of the insertion members 200 is maintained to secure the driving unit 105 to the housing 102, 123. Then, it is possible to perform a process of hardening the housing 123, 102 including the lens assembly 104, and the like in operation 970.

As described above, according to the camera module supporting the tilt correction of the present disclosure, it is possible to realize the structure of the camera module to enable the type conversion from a passive assembly process to an active assembly process at the time of manufacturing the camera module with the auto focus type actuator. Accordingly, it is possible to apply mass production by means of the reduction of the manufacturing time required for the assembly of the camera module and the decrease of the facility investment.

Also, according to the method for correcting the tilting of the camera module of the present disclosure, it is possible to compensate for the errors produced by the tilting of the lens effectively, by converting into the active assembly process type by using the following active alignment device, although the lens assembly and the driving unit are assembled to the housing by the passive type assembly process, at the time of manufacturing the camera module.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Although various examples have been provided in the present disclosure, these examples are used in a general sense in order to easily explain technical contents of the present disclosure, and to help comprehension of the present disclosure, and are not intended to limit the scope of the present disclosure. It will be clear to those skilled in the art to which the present disclosure belongs that other modifications can be established without departing from the technical spirit of the present disclosure.

What is claimed is:

1. A camera module with adjustable lens tilt comprising:
a housing;
a lens assembly provided in the housing to move up and down in a direction of an optical axis of an image sensor, and including at least one lens; and
a driving unit coupled to the lens assembly to produce driving force for moving the lens assembly,
wherein the driving unit is configured to be tiltably coupled to the housing through a hole formed by the driving unit and the housing, and
a tilting of the driving unit with respect to the housing is adjusted based on a change in a relative position of the driving unit to the housing within the hole.

2. The camera module according to claim 1, wherein:
the driving unit includes a groove; and
the housing includes a protrusion inserted into the groove.

3. The camera module according to claim 2, wherein the protrusion is smaller in size than the groove so as to permit the protrusion to move towards one or more walls of the groove when the protrusion is inserted into the groove.

4. The camera module according to claim 3, wherein the lens assembly is magnetically coupled to the driving unit.

5. The camera module according to claim 1, wherein the housing comprises:
a filter housing coupled to the image sensor;
a guide housing that extends from the filter housing in the direction of the optical axis of the image sensor, the guide housing being open at one side, and the guide housing surrounding a portion of an outer surface of the lens assembly and a portion of the outer surface of the driving unit; and
a top cover installed on the guide housing to protect the driving unit and the lens assembly.

6. The camera module according to claim 5, wherein the driving unit is received in an open side of the guide housing.

7. The camera module according to claim 1, further comprising:
a insertion member fitted in the hole to fix the driving unit to the housing.

8. The camera module according to claim 7, wherein when the insertion member is fitted in the hole, the driving unit is restricted to move up and down in the housing.

9. The camera module according to claim 7,
wherein the insertion member extends in the direction of the optical axis and an upper portion of the insertion member that is disposed outside of the hole has a size larger than a size of the hole.

10. The camera module according to claim 7, wherein the insertion member prevents the driving unit from moving relative to the housing in the direction of the optical axis.

* * * * *